US005689995A

United States Patent [19]
Heckel, Jr.

[11] Patent Number: 5,689,995
[45] Date of Patent: Nov. 25, 1997

[54] ACTUATOR THAT ADJUSTS TO SIDE LOADS AUTOMATICALLY BY PIVOTING INTERNALLY

[75] Inventor: Donald T. Heckel, Jr., Simi Valley, Calif.

[73] Assignee: P. L. Porter Co., Woodland Hills, Calif.

[21] Appl. No.: 595,300

[22] Filed: Feb. 1, 1996

[51] Int. Cl.$^6$ .................................................. F16H 25/24
[52] U.S. Cl. ........................... 74/89.15; 74/424.8 R; 74/459; 188/67; 297/362.14
[58] Field of Search ................ 74/424.8 R, 459, 74/89.15; 188/67; 297/362.14

[56] References Cited

U.S. PATENT DOCUMENTS

| Re. 34,142 | 12/1992 | Fimeri | 74/89.15 X |
|---|---|---|---|
| 2,579,305 | 12/1951 | Cushman | 74/424.8 R |
| 3,583,762 | 6/1971 | Stries | 297/361 |
| 4,040,663 | 8/1977 | Christensen | 74/424.8 R |
| 4,291,914 | 9/1981 | Mizelle | 297/361 |
| 4,482,211 | 11/1984 | Fisher | 74/89.15 X |
| 4,782,715 | 11/1988 | Chevance | 74/89.15 X |
| 4,799,734 | 1/1989 | Periou | 297/361 |
| 4,805,866 | 2/1989 | Aihara et al. | 248/429 |
| 4,807,856 | 2/1989 | Teckenbrock | 297/345 X |
| 4,881,775 | 11/1989 | Rees | 297/361 |
| 4,900,059 | 2/1990 | Kinoshita et al. | 74/459 |
| 5,150,872 | 9/1992 | Isomura | 248/429 |
| 5,209,637 | 5/1993 | Reubeuze | 475/176 |
| 5,259,257 | 11/1993 | Mouri | 74/89.15 |
| 5,277,672 | 1/1994 | Droulon et al. | 475/176 |
| 5,320,413 | 6/1994 | Griswold et al. | 297/362.12 |

FOREIGN PATENT DOCUMENTS 986283  3/1965  United Kingdom.

Primary Examiner—Allan D. Herrmann
Attorney, Agent, or Firm—Oppenheimer Poms Smith

[57] ABSTRACT

The actuator includes a housing and a gear nut within the housing. A leadscrew on which the gear nut is threaded traverses the housing. As the leadscrew moves axially, the gear nut rotates. The actuator allows a manually controlled ball in a groove to project into castellations on the outside of the gear nut to prevent the nut from rotating. This locks the leadscrew. Disengaging the ball from the gear nut releases the gear nut and leadscrew. To prevent misalignment between the gear nut and leadscrew, the gear nut's outer walls and the housing's inner walls are spherical against each other. A bearing may be in between. This permits the gear nut's axis of rotation to pivot in any direction along with any pivoting of the leadscrew while the gear nut still can rotate about the leadscrew. Therefore, if the leadscrew is not aligned with the housing, the leadscrew will pivot the gear nut so that the gear nut remains aligned with the leadscrew and movement of the leadscrew still occurs.

18 Claims, 2 Drawing Sheets

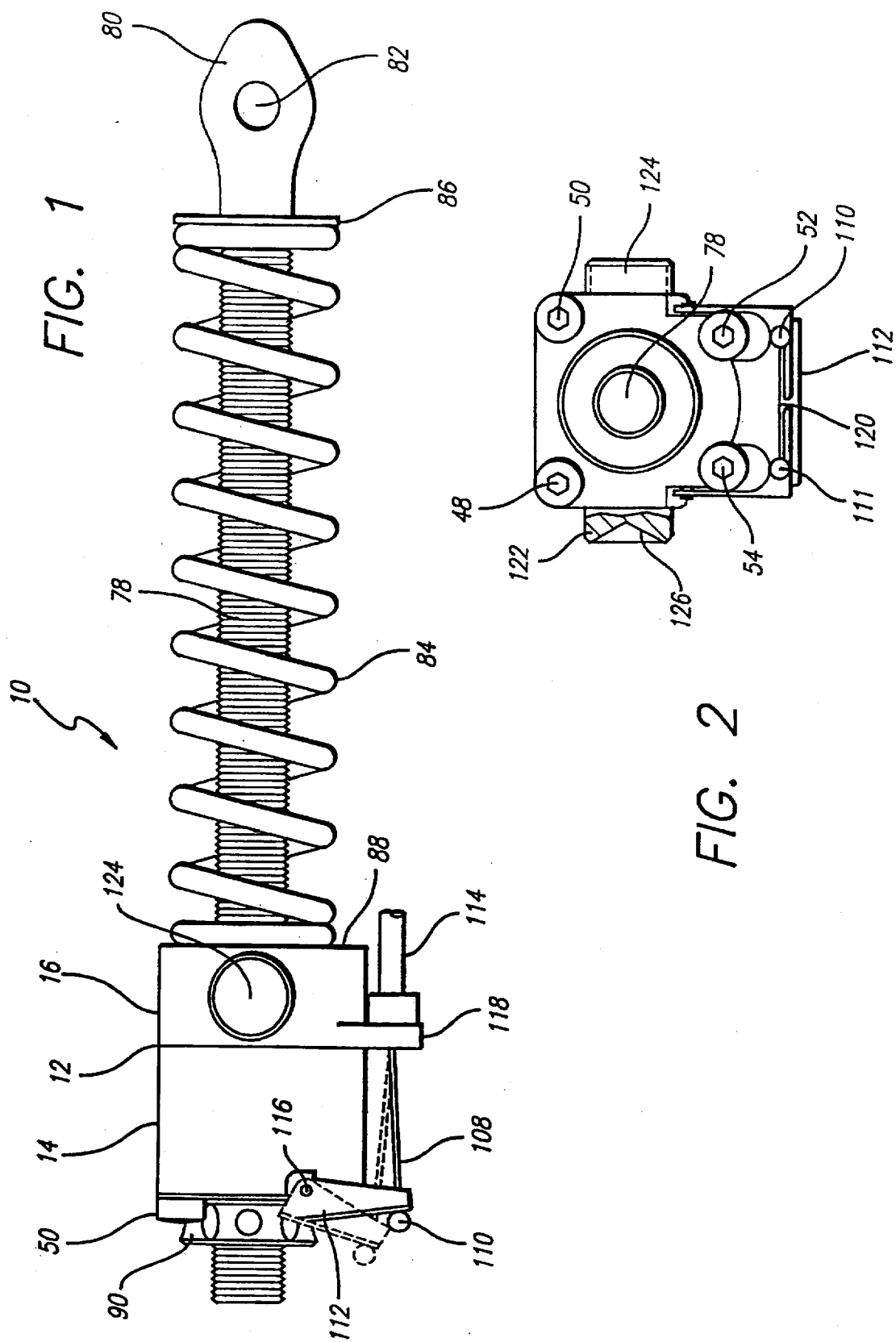

5,689,995

ACTUATOR THAT ADJUSTS TO SIDE LOADS AUTOMATICALLY BY PIVOTING INTERNALLY

BACKGROUND OF THE INVENTION

1. Field of the Invention

The present invention relates to seat actuators, primarily those used for vehicle seat recliners and possibly seat positioners.

2. State of the Art

As safety concerns for automobile and truck passengers increase, vehicle seats have become more complex. Linear actuators for allowing vehicle seats to move and the seat back to pivot are becoming increasingly complicated. One proposed linear actuator uses a leadscrew or threaded shaft. As it moves forward or backward axially due to the seat being reclined, a threaded gear nut or spin nut rotates about the leadscrew. The spin nut has a clutch that disengages the leadscrew when the user manually activates a recline lever. When the user releases the recline lever the clutch engages the shaft and prevents rotation of the spinning nut. That locks the leadscrew from further axial movement. Griswold, U.S. Pat. No. 5,320,413 (1994), Rees U.S. Pat. No. 4,881,775 (1989), and Périou U.S. Pat. No. 4,799,734 (1989), are examples of patents teaching this or similar types of seat actuators.

If a linear actuator is out of alignment, it can malfunction. That is, if the leadscrew is out of alignment (i.e., aligned up, down, to the side or at any angle to the gear nut), the gear nut does not spin freely around the leadscrew. Consequently, the leadscrew does not move freely backward and forward.

It has been proposed to use a gimbal mount for the entire mechanism as a way to overcome misalignment. The gimbal is expensive to manufacture and may require additional threaded fasteners that also are costly to make. Additionally, because of the added parts and the complexity of the gimbal mount, installation costs are high.

SUMMARY OF THE INVENTION

The principal object of the present invention is to disclose and provide a high-load linear actuator that compensates for installation and other misalignments.

The actuator includes a leadscrew that traverses the actuator housing. A gear nut within the housing surrounds and is threaded onto the leadscrew. As the leadscrew moves axially through the housing, the gear nut rotates. A ball, which is manually controlled by the user of the seat, moves in a slot radially to the gear nut. The ball can engage or disengage castellations on the gear nut. When the ball partially projects from the slot, the ball engages a gear nut castellation. The nut does not turn because the slot prevents the ball from rotating with the gear nut. Therefore, the leadscrew cannot move axially and the actuator is locked.

To prevent misalignment between the gear nut and leadscrew, the gear nut can pivot up, down, to the side or at an angle within the housing. Therefore, if the leadscrew is not aligned with the housing, the leadscrew pivots the gear nut so that the gear nut remains aligned with the leadscrew. To accomplish pivoting, the gear nut has spherical ends or inserts with spherical end surfaces, and the housing has inner walls that are spherical. The inserts or spherical radii of the gear nut itself, against the inner walls, therefore, allow gear nut rotation, and they can slide relative to each other so that the gear nut can follow the lead screw's orientation. The spherical radii, in contact with each other also allow the gear nut to spin.

The actuator has a two-piece housing. The housing sections can be tightened relative to each other to squeeze against the spherical gear nut or its inserts. This minimizes "chuck," which is undesired movement of the leadscrew while the unit is locked.

These and other objects of the invention may be seen more clearly from the detailed description of the preferred embodiment that follows.

BRIEF DESCRIPTION OF THE DRAWINGS

FIG. 1 is a side view of the linear actuator of the present invention.

FIG. 2 is an end view of the linear actuator of the present invention as seen from the left side of FIG. 1 with the stop ring removed to reveal certain aspects of the actuator.

DETAILED DESCRIPTION OF THE PREFERRED EMBODIMENTS

Figure 3:
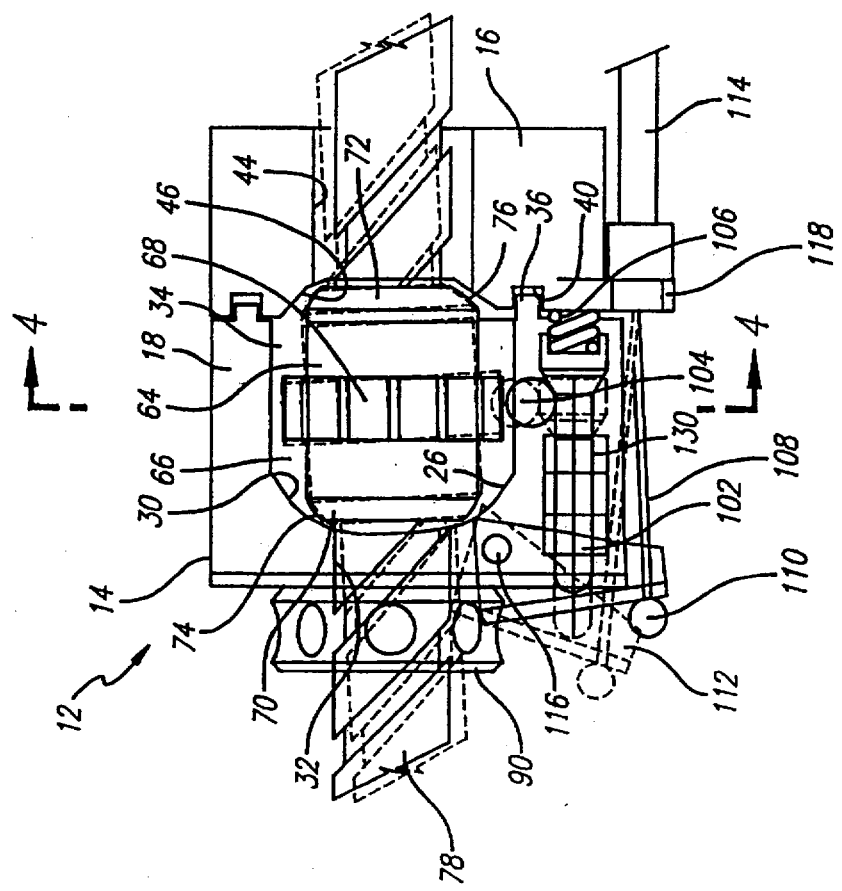
FIG. 3 is a side, sectional view of a portion of the linear actuator of the present invention.

The linear actuator 10 of the present invention includes a housing 12 (FIGS. 1 and 3). In the exemplary embodiment, the housing is formed of plastic, but it may also be formed of die cast metal or of some metal and some plastic sections.

Housing 12 has two major sections, a plastic main section 14 and a metal mounting block 16 (FIGS. 1 and 3). Upstanding wall 18 and end wall 26 form main section 14. The end wall's inner surface 30 is spherical. Upstanding wall 18 forms a cylinder at the open end 34 of the main housing (FIGS. 3 and 4), which curves into the spherical end 30 (FIG. 3). End wall 26 also has a tapered hole 32 extending through it (FIG. 3).

As FIG. 3 shows, upstanding wall 18 has a circumferential projection 36. When mounting block 16 is mounted over the open end 34 of main housing 12, projection 36 projects into a corresponding circumferential groove or trepan 40 on the mounting block (FIG. 3). An arrangement other than circumferential projections and grooves can be used to mount the housing and the mounting block together. For example, short pegs may fit into indentations. Small springs (not shown) could mount in a groove or indentation to bias the housing and mounting block apart.

The mounting block also has a spherical inner surface 46 (FIG. 3) and a central tapered hole or bore 44. Surfaces 30 and 46 are approximately the same or are part of the same sphere. That is, the surfaces in theory have a common center and nearly, if not, equal radii.

Four bolts 48, 50, 52 and 54 (FIG. 2) extend through bores 56, 58, 60 and 62 (FIG. 4) in the mounting block. The bolts thread into threaded bores (not shown) in the end of the mounting block. Rivets, self-tapping screws and similar fasteners could replace the bolts and threaded bores. Also, the exemplary embodiment uses four bolts, but more or fewer could be used.

Gear nut 64 (FIGS. 3 and 4) fits within space 66 inside the open end 34 of main housing 14 and extends between the main housing's spherical wall 30 and the spherical wall 46 of mounting block 16. The gear nut is generally cylindrical (FIG. 3) with a larger diameter central ring 68. Optional nylon or other low friction annular inserts 70 and 72 attach to the end of the gear nut. The inserts are open in their centers and have spherical end surfaces 74 and 76 (FIG. 3). These spherical surfaces conform to spherical walls 30 and 46 of the main housing and mounting block in that all surfaces have nearly the same center and radius. Accordingly, the gear nut can pivot with the longitudinal axis of the leadscrew in any direction within space 66. All spherical walls 30, 46, 70 and 72 should be smooth to reduce friction.

Using plastic or partially plastic inserts or bearings decreases the cost of the gear nut. Alternatively, the gear nut could be a powdered metal part, metal injection molding or machined to have spherical ends.

A shaft or leadscrew transverses the housing. In the exemplary embodiment (FIGS. 1 and 3), leadscrew 78 has an ACME thread. One choice for the leadscrew is ⅝ in (16 mm [metric conversions are rounded and approximate]) diameter with a 4 threads per inch pitch and four starts. Only FIG. 3 shows the threads of the leadscrew, and they are not drawn to scale. The design of the seat that incorporates the actuator of the present invention determines the leadscrew's length. One end of the leadscrew is flattened to form a tang 80 (FIG. 1 ). A center opening 82 in the tang allows that end of the actuator to be attached to part of the seat assembly.

As FIG. 1 shows, a return spring 84, which surrounds the leadscrew, extends between washer 86 and wall 88 of mounting block 16. Other arrangements that do not use the washer may be used. The spring is in compression to bias the leadscrew to the right in FIG. 1. Stop ring 90 is crimped on the left end (FIGS. 1 and 3) of the leadscrew to prevent the leadscrew from being withdrawn from the housing. One can employ alternate methods, such as a formed end on the leadscrew after it is installed, to accomplish the same goal without the stop ring.

Gear nut 64 is open at 92 at its center. See FIG. 4. The gear nut also has internal threads that correspond with the leadscrew's threads. Also, inserts 74 and 76 have openings that are aligned with the gear nut's opening so that the leadscrew passes freely through the inserts.

Figure 4:
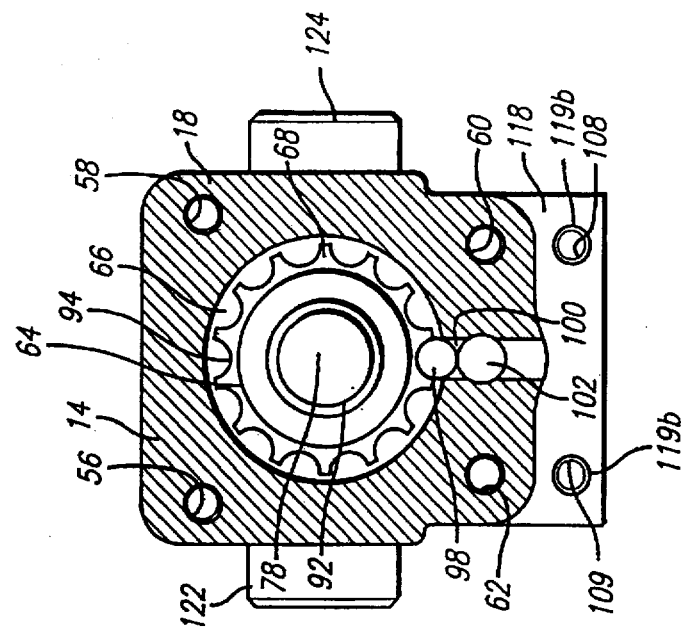
FIG. 4 is a sectional view through plane 4—4 of FIG. 3.

As the leadscrew moves axially (because of a force on tang 80), the gear nut rotates within space 66 (FIG. 3). The gear nut's ring 68 has circumferentially spaced castellations 94 (FIG. 4), sixteen in the exemplary embodiment. A ball 98 in housing groove 100 can move into a castellation. When that occurs, the gear nut cannot rotate. FIG. 4 shows the ball in the locked position. A piston 102 (FIGS. 3 and 4) which is mounted in the housing, has a section with a larger diameter 104 that can be positioned below ball 98. FIG. 4 shows that part of the piston passes through part of groove 100.

Spring 106 biases the piston to the left (FIG. 3). A wire 108 attaches to bracket 112 on the left end of housing 12 (FIGS. 1 and 3). The bracket pivots on pin or projection 116 on the housing and rests against piston 102. The bracket has a slot 120 (FIG. 2) that receives wire 108. A stop 110 on the end of the wire secures the wire to the bracket. When one manipulates an actuator such as a handle or button (not shown), the actuator pulls the wire 108 to the right (FIGS. 1 and 3). As a result, bracket 112 pushes piston 102 to the right (FIG. 3) and causes a narrower diameter section 130 of the piston to move under ball 98. Consequently, the ball moves out of its castellation and gear nut 64 freely rotates. Therefore, leadscrew 78 can move axially. Upon release of the handle, spring bias pushes piston 102 to the left (FIG. 3) and returns bracket to its left-most position. When the piston moves to the left, its raised portion 104 pushes ball 98 into a castellation. As FIG. 4 shows, ball 98 remains partially within groove 100. Therefore, the ball cannot rotate with the gear. Therefore, when the ball is in a castellation, the ball/groove connection prevents gear nut rotation. This locks the leadscrew.

One could substitute a pivoting or rocking member with a appropriate end in place of ball 98. Also, slots or grooves could substitute for the rounded castellations 94. One could also use various clutch mechanisms to secure and release the leadscrew. Applicant refers to application Ser. No. 08/541, 148, filed 11 Oct. 1995, by C. R. Stringer, and assigned to P. L. Porter Co., the assignee of the present application, for additional discussions about alternative spinning nut structures. That application is incorporated by reference.

The wire 108 leads to cable 114, which is attached to bracket 118 (having apertures 119a and 119b) on part of the bottom of the mounting block 16 (FIGS. 1, 3 and 4). The other end of the wire attaches remotely to an actuator accessible to the user of the seat. Bracket 118 could house a second cable with a second wire 109 to a second actuator. See FIG. 2 which shows 2 stops 110 and 111 on the end of the wires. For example, one handle could be within reach of the person sitting in the seat, and the second handle could be within reach of a rear seat passenger or person entering a car who needs to pivot the seat back to enter the rear seat area.

A pair of bosses 122 and 124 are a part of and project from the sides of mounting block 16 (FIGS. 1, 2 and 4). For strength, the bosses preferably are metal. Each may have a 120° conical indentation 126 (FIG. 2). Mounting hardware on the vehicle seat (not shown) accepts and restrains the bosses so that the bosses can pivot while constrained by the hardware. This allows the actuator to pivot about an axis through the bosses.

If the leadscrew 78 is not properly aligned with gear nut 64, the leadscrew would tend to bind as it moved through the gear nut. See FIG. 3, which shows the leadscrew in orientations relative to the housing. In the present invention, any leadscrew misalignment pivots the gear nut with the leadscrew (See FIG. 3) as the spherical surfaces 74 and 76 of inserts 70 and 72 slide along and spin against the spherical inner walls 30 and 46. Therefore, the leadscrew and gear nut remain aligned and do not bind.

The spherical surfaces 74 and 76 of inserts 70 and 72 must apply proper force to spherical inner walls 30 and 46. This is accomplished by tightening bolts 48, 50, 52 and 54 or other comparable fasteners properly. Proper tightening minimizes "chuck," the undesired movement of the leadscrew or gear nut relative to the rest of the locked assembly.

The embodiment that has been described is manually activated. It could be electrically operated with some modifications. For example, instead of having castellations 94, gear nut 64 could be a helical gear that a mating gear or worm could drive. Locking the driving motor would lock the gear nut.

Another modification concerns the mounting of ball 98. Instead of relying on gravity to remove the ball from a castellation, the ball could be spring mounted.

Other numerous modifications and alternate embodiments will occur to those skilled in the art. Therefore, applicant intends that the invention be limited only in terms of the appended claims.

I claim:

1. A linear actuator comprising a housing including an open space defined by curved inwardly facing walls, a leadscrew traversing the housing, a gear nut in the housing around the leadscrew and rotating in response to axial movement of the leadscrew relative to the gear nut, the gear nut defining curved outer walls, at least a portion of each of the curved outer walls of the gear nut being in spaced relation to an adjacent curved inwardly facing wall of the housing, the housing mounting the leadscrew for pivoting to change the axis of rotation of the gear nut within the housing.

2. The linear actuator of claim 1 wherein the inwardly facing walls of the housing have curvature corresponding to the curvature of the outer walls of the gear nut, and the gear nut pivots relative to the curved walls of the housing.

3. The linear actuator of claim 2 wherein the curved walls of the housing and the gear nut are spherical.

4. A linear actuator comprising:
 a. a housing having an open central section, an end wall having a spherical surface over at least part of the end wall, a mounting block at the opposite end of the end wall, the mounting block having a spherical surface over at least part of the mounting block, the spherical surfaces of the end wall and the mounting block facing each other, the end wall and the mounting block each having a central hole opposite each other;
 b. a gear nut in the housing extending between the spherical surfaces of the end wall and mounting block, the gear nut having a central opening and curved end surfaces and being located within the housing such that at least a portion of each of the curved end surfaces is in spaced relation to the respective adjacent spherical surface of end wall or mounting block; and
 c. a leadscrew traversing the housing and threaded through the gear nut, the gear nut being against the spherical surfaces and rotating about the leadscrew in response to axial movement of the leadscrew through the housing;
 d. the gear nut pivoting to change the axis of rotation of the gear nut relative to the housing.

5. The linear actuator of claim 4 wherein the curved end surfaces of the gear nut comprise spherical outer walls.

6. The linear actuator of claim 5 wherein inserts form at least one spherical outer wall.

7. A linear actuator, comprising:
 a housing having an open central section, an end wall having a spherical surface over at least part of the end wall, a mounting block at the opposite end of the end wall, the mounting block having a spherical surface over at least part of the mounting block, the spherical surfaces of the end wall and the mounting block facing each other, the end wall and the mounting block each having a central hole opposite each other;
 a gear nut in the housing extending between the spherical surfaces of the end wall and mounting block, the gear nut having a central opening and castellations extending around the gear nut;
 a leadscrew traversing the housing and threaded through the gear nut, the gear nut being against the spherical surfaces and rotating about the leadscrew in response to axial movement of the leadscrew through the housing;
 a groove in the housing extending toward the castellations;
 a ball moveable within the groove between a position partially projecting from the groove and extending into a castellation and a position retracted from a castellation; and
 a piston in the housing in contact with the ball, the piston having portions of different diameters, the piston moving in the housing from a position in which the smaller diameter portion is adjacent the ball to allow the ball to retract from a castellation and a wider diameter portion pushing the ball toward the castellation;
 wherein the gear nut pivots to change the axis of rotation of the gear nut relative to the housing.

8. The linear actuator of claim 7 further comprising a spring in the housing and operably connected to the piston, the spring biasing the piston to position the wider diameter portion in contact with the ball.

9. The linear actuator of claim 4 wherein the central holes are tapered.

10. A linear actuator, comprising:
 a housing including an open space defined by curved inwardly facing walls;
 a leadscrew traversing the housing; and
 a gear nut in the housing around the leadscrew and rotating in response to axial movement of the leadscrew relative to the gear nut, the gear nut defining curved outer walls which rotate relative to the respective curved inwardly facing walls of the housing;
 wherein the gear nut pivots to change the axis of rotation of the gear nut relative to the housing.

11. A linear actuator as claimed in claim 10, wherein the inwardly facing walls of the housing have curvature corresponding to the curvature of the outer walls of the gear nut, and the gear nut pivots relative to the curved walls of the housing.

12. A linear actuator as claimed in claim 11, wherein the curved walls of the housing and gear nut are spherical.

13. A linear actuator as claimed in claim 10, further comprising:
 castellations extending around the gear nut;
 an object moveable between a position extending into a castellation and a position retracted from a castellation;
 a piston associated with the housing and having a cam surface capable of contacting the object, the piston moving relative to the housing from a position which allows the object to retract from a castellation and a position which pushes the object toward a castellation.

14. A linear actuator, comprising:
 a housing including a first portion having a curved inwardly facing wall and a second portion having a curved inwardly facing wall, the first and second housing portions defining separate structural elements;
 a leadscrew traversing the housing;
 a gear nut in the housing around the leadscrew and rotating in response to axial movement of the leadscrew relative to the gear nut, the gear nut defining curved outer walls, at least a portion of each of the curved outer walls of the gear nut being in spaced relation to an adjacent curved inwardly facing wall of the housing; and
 an adjustment mechanism associated with the first and second housing portions for selectively adjusting the distance therebetween;
 wherein the gear nut pivots to change the axis of rotation of the gear nut relative to the housing.

15. A linear actuator as claimed in claim 14, wherein the adjustment mechanism comprises a plurality of bolts.

16. A linear actuator as claimed in claim 14, wherein the inwardly facing walls of the housing have curvature corresponding to the curvature of the outer walls of the gear nut, and the gear nut pivots relative to the curved walls of the housing.

17. A linear actuator as claimed in claim 16, wherein the curved walls of the housing and gear nut are spherical.

18. A linear actuator as claimed in claim 14, further comprising:
 castellations extending around the gear nut;
 an object moveable between a position extending into a castellation and a position retracted from a castellation;
 a piston associated with the housing and having a cam surface capable of contacting the object, the piston moving relative to the housing from a position which allows the object to retract from a castellation and a position which pushes the object.

* * * * *